Figure 1:
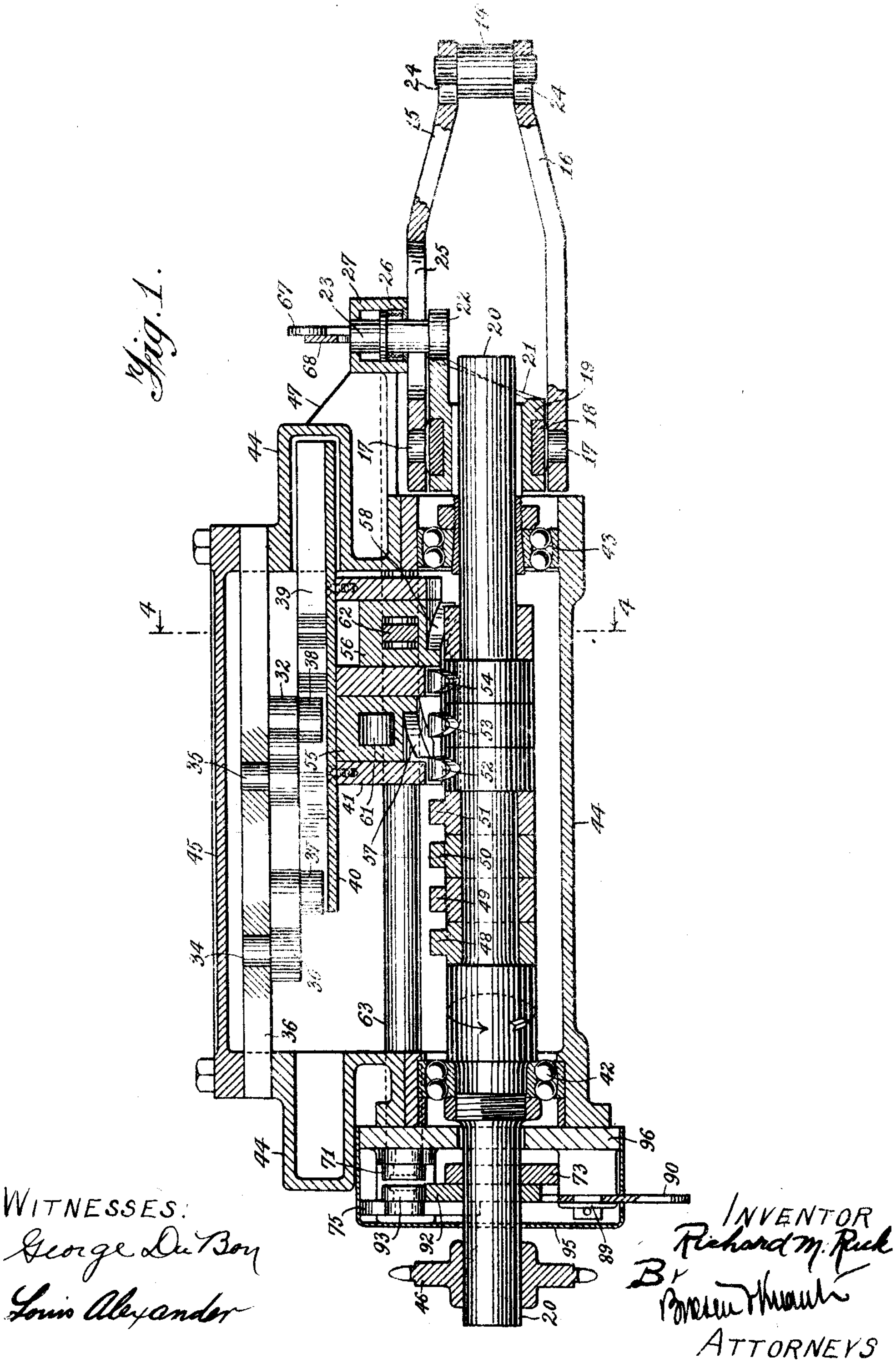

R. M. RUCK.
VARIABLE SPEED MECHANISM.
APPLICATION FILED JUNE 5, 1914.

1,179,659. Patented Apr. 18, 1916.
6 SHEETS—SHEET 1.

WITNESSES:
George DuBoy
Louis Alexander

INVENTOR
Richard M. Ruck
By Brown & Knauth
ATTORNEYS

R. M. RUCK.
VARIABLE SPEED MECHANISM.
APPLICATION FILED JUNE 5, 1914.

1,179,659.

Patented Apr. 18, 1916.

6 SHEETS—SHEET 2.

WITNESSES:
George Du Bon
Louis Alexander

INVENTOR
Richard M. Ruck
BY
Brewer & Knauth
ATTORNEYS

R. M. RUCK.
VARIABLE SPEED MECHANISM.
APPLICATION FILED JUNE 5, 1914.

1,179,659.

Patented Apr. 18, 1916.
6 SHEETS—SHEET 3.

WITNESSES:

INVENTOR
Richard M. Ruck
BY
ATTORNEYS

1,179,659.

Patented Apr. 18, 1916.

Witnesses:
George Du Bon
Louis Alexander

Inventor
Richard M. Ruck
By Bowen Wheat [signature]
Attorneys

R. M. RUCK.
VARIABLE SPEED MECHANISM.
APPLICATION FILED JUNE 5, 1914.

1,179,659.

Patented Apr. 18, 1916.
6 SHEETS—SHEET 5.

WITNESSES:
George Du Bon
Louis Alexander

INVENTOR
Richard M. Ruck
BY
[signature]
ATTORNEYS

R. M. RUCK.

VARIABLE SPEED MECHANISM.

APPLICATION FILED JUNE 5, 1914.

1,179,659.

Patented Apr. 18, 1916

6 SHEETS—SHEET 6.

WITNESSES

G. V. Rasmussen

[illegible]

INVENTOR

RICHARD MATTHEWS RUCK

BY

Briesen & Schrenk

ATTORNEYS

UNITED STATES PATENT OFFICE.

RICHARD MATTHEWS RUCK, OF SOUTH KENSINGTON, LONDON, ENGLAND.

VARIABLE-SPEED MECHANISM.

1,179,659. Specification of Letters Patent. Patented Apr. 18, 1916.

Application filed June 5, 1914. Serial No. 843,317.

*To all whom it may concern:*

Be it known that I, RICHARD MATTHEWS RUCK, a subject of the King of Great Britain, and resident of 44 Thurloe Square, South Kensington, London, S. W., England, have invented certain new and useful Improvements in or Relating to Variable-Speed Mechanism, of which the following is a specification.

In cases where variable-speed mechanism receives or transmits motion through the medium of a clutch, it is desirable that this clutch (hereinafter referred to as the driving-clutch) should be thrown out of action just before, and into action just after, a change of gear is brought about, so that the variable-speed mechanism shall be relieved of driving-stress during the interval occupied in effecting the change.

In order to relieve the person who controls the variable-speed mechanism (hereinafter referred to as the driver) of the necessity of paying separate attention to the control of the driving-clutch itself, it has already been proposed to operate this clutch, in the manner above stated, by mechanism actuated by the hand-lever or foot-lever by whose movement the changes of gear are brought about, such mechanism being adapted to act automatically in proper coördination with the mechanism whereby each change of gear is effected. So far as I am aware the power employed or transmitted for the purpose of thus operating the driving-clutch has, however, been solely that exerted by the driver himself.

According to the present invention (which is especially designed for use in the propulsion of automobiles, air-craft, motor-boats, and other apparatus driven by high-speed engines) mechanical power, which may conveniently be that of the engine whose motion is transmitted by the variable-speed mechanism, is utilized for operating the driving-clutch, the device whereby this is effected being capable of being brought into play at will and of thereafter acting automatically in proper coördination with the mechanism whereby each change of gear is brought about.

The device whereby the driving-clutch is thus operated by mechanical power may be combined with mechanism adapted to utilize mechanical power for also effecting each change of gear (or each step in such change, if a change of gear be performed in more than one step), the arrangement being preferably such that, on a change of gear (or step in such change) being initiated by the driver, all the remaining mechanical operations incidental to the change (or step therein) will be carried to completion automatically and in proper coördination with one another.

It is to be understood that the term "engine" used throughout this description and in the appended claims is employed for the sake of convenience, and includes any kind of prime mover.

In a practical form of the invention the lever (or equivalent member) whereby the driving-clutch is thrown into and out of action is coupled to a rotary cam which is driven by the engine so as to make one revolution each time a change of gear (or one of the steps therein) is to be effected; this cam, which is mounted to slide lengthwise of its axis of rotation so as to be adapted to impart the requisite motion to the clutch-lever, being of such form as to be caused to slide thus during an interval beginning just before and ending just after the change (or step thereof), in consequence of the interposition in the path of revolution of the cam, at the proper time, of an abutment adapted to coact with the cam and connected to (so as to be displaceable from normal or inoperative position in time with) the hand-lever, pedal, or equivalent member whereby each change of gear (or step therein) is initiated or brought about at will.

For the purpose of causing the abutment to be moved into and out of the path of the clutch-controlling cam at the proper moments relatively to each change of gear, it is preferred to employ an improved form of the coördinating apparatus described in the specification of my Patent No. 1,043,629, this coördinating apparatus being designed for enabling the movable gear-wheel or wheels of the variable-speed mechanism to be shifted by power and for insuring that such shifting-movement shall be initiated (by the action of the controlling hand-lever just mentioned) only at the proper moment and completed when once begun.

Figure 2:
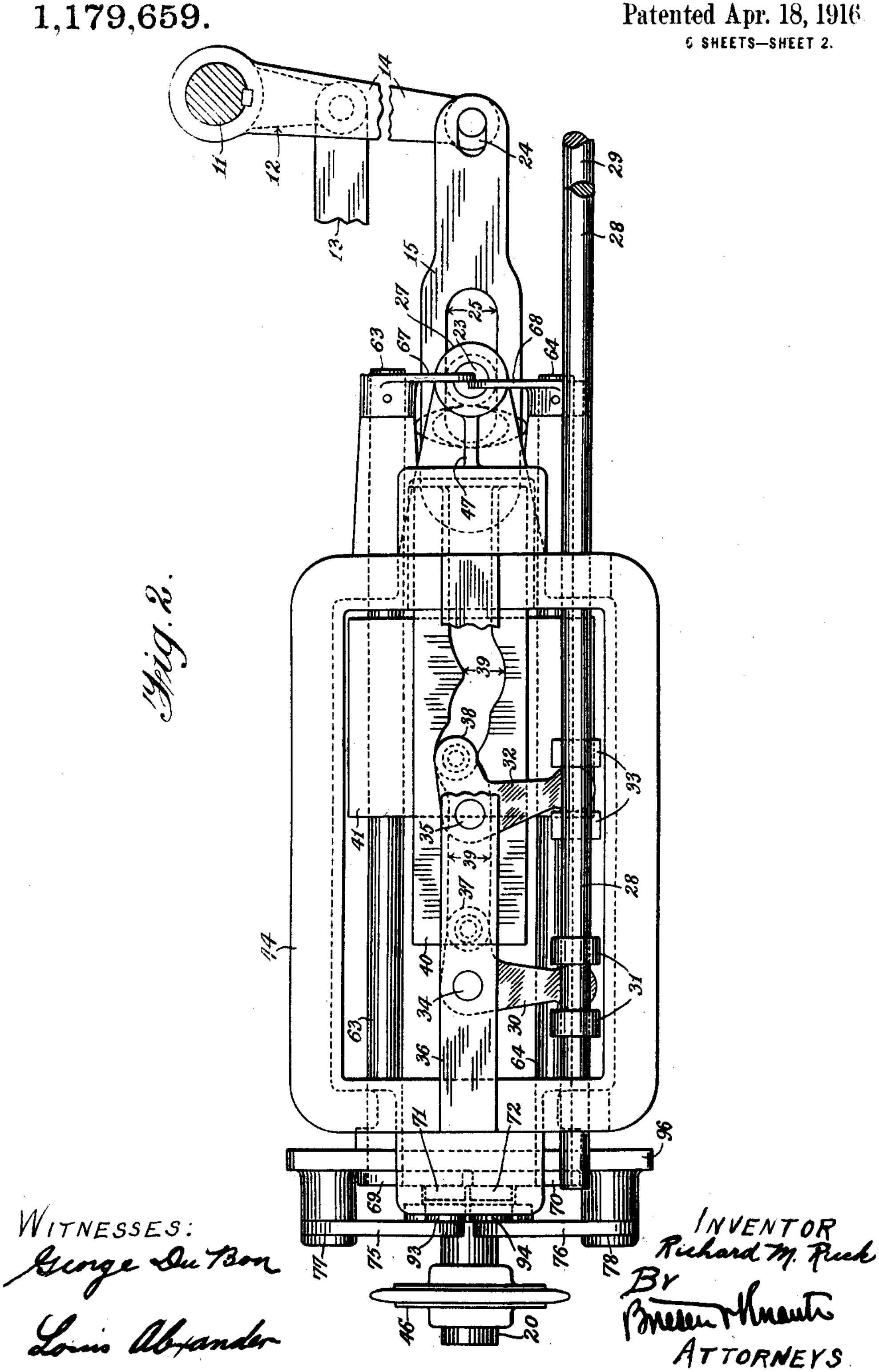
Figure 3:
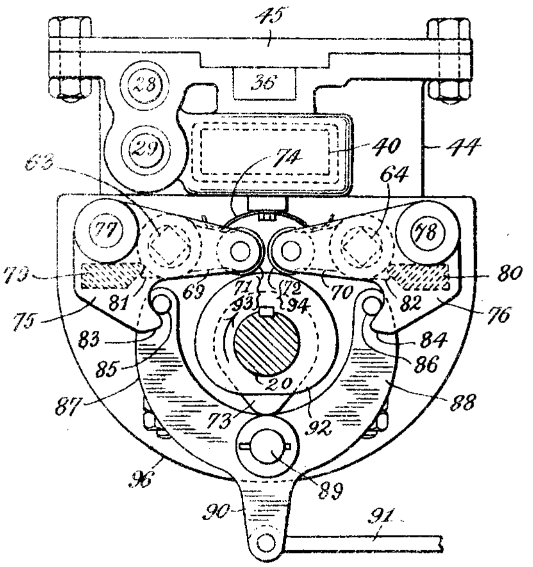
Figure 4:
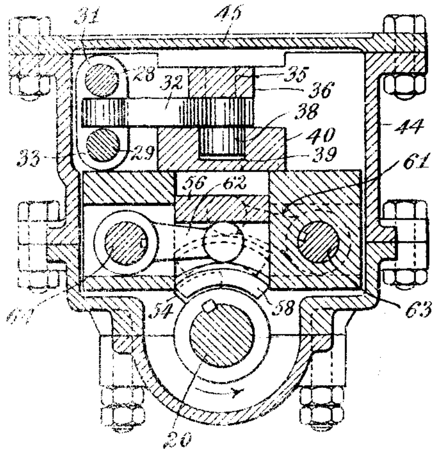
Figure 5:
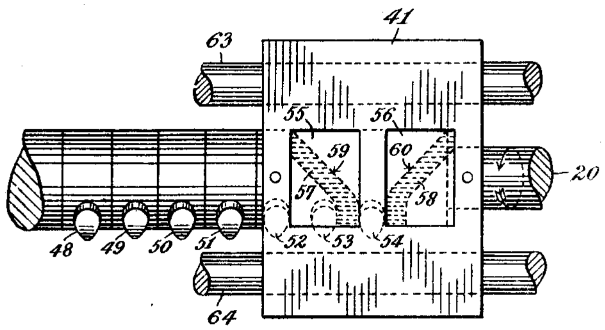
Figure 6:
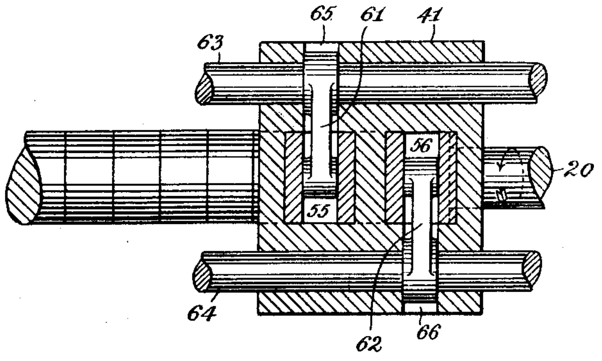
Figure 7:
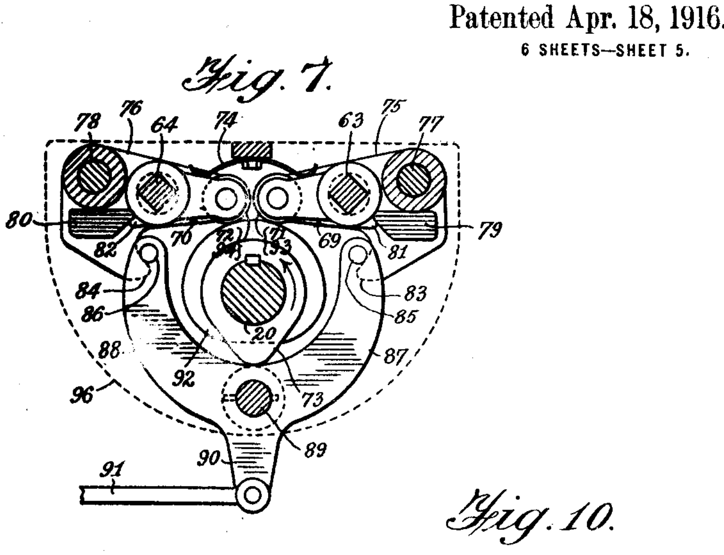
Figure 9:
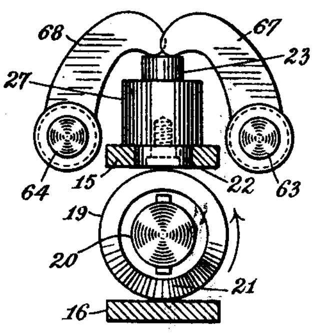
Figure 10:
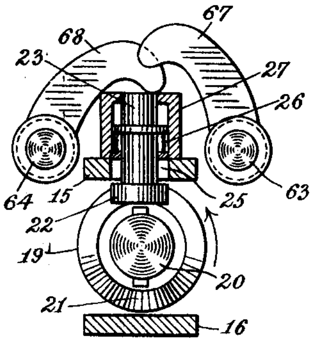
Figure 8:
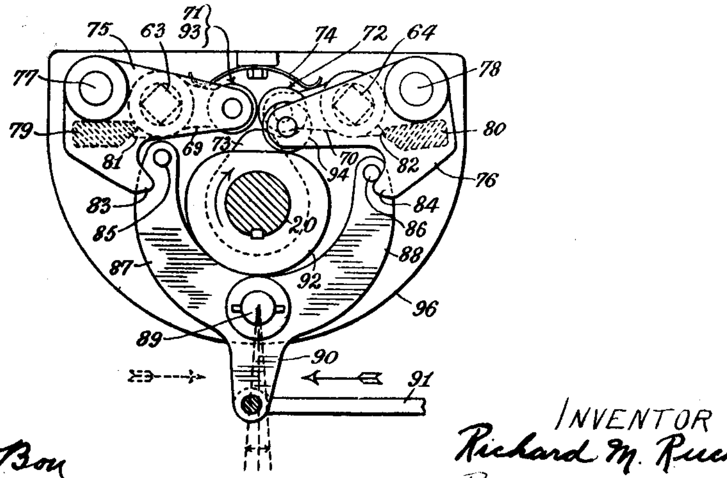
Figure 11:
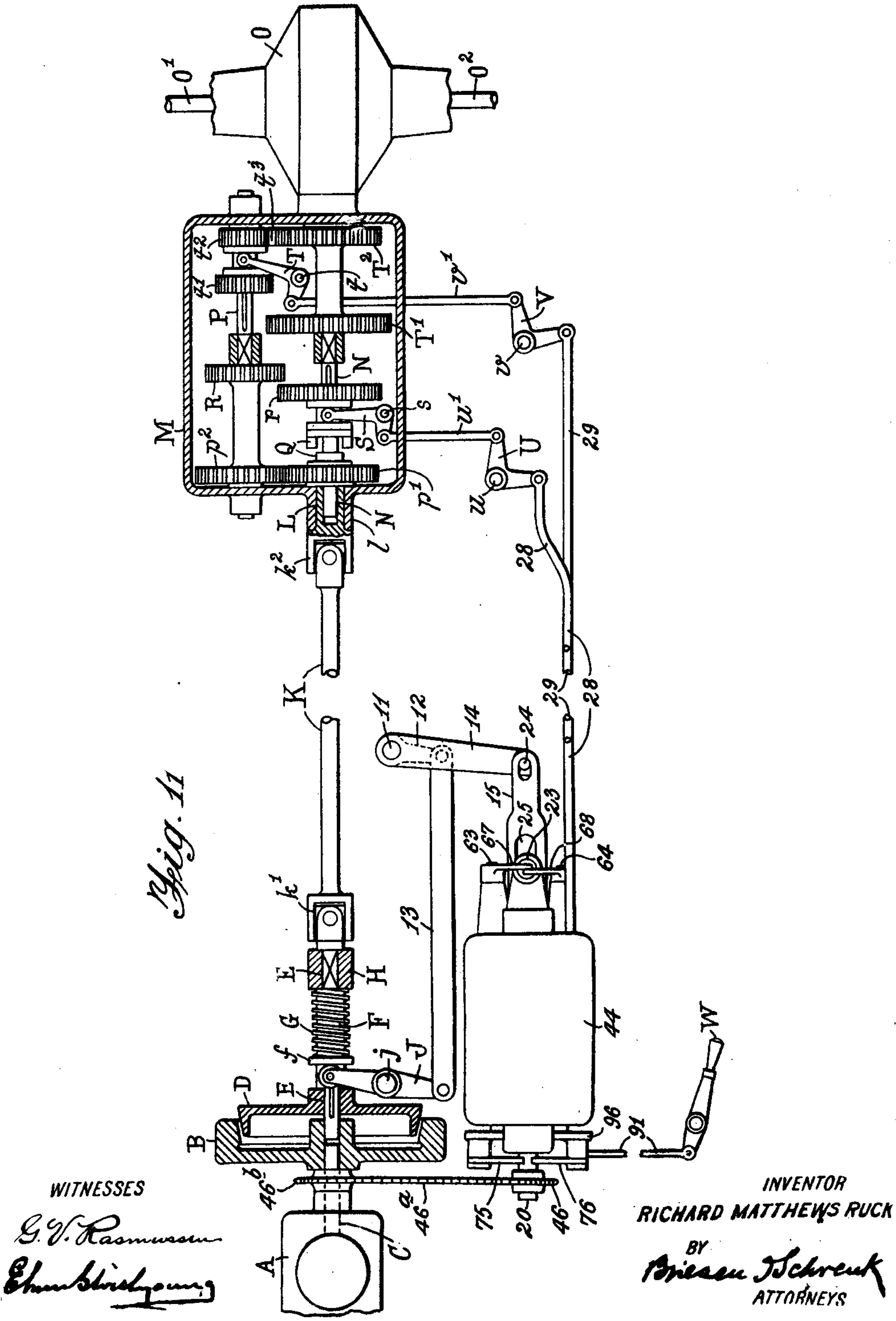

In the accompanying drawings, which illustrate a convenient arrangement of apparatus for carrying out the present invention, Figure 1 is a sectional side elevation of the apparatus, and Fig. 2 is a plan view of the same, the cover of the casing being removed and parts being removed or broken away for the sake of clearness. Fig. 3 is an end elevation, showing a front view of the automatic timing mechanism, with the parts in normal position. Fig. 4 is a cross-section on line 4—4 of Fig. 1, looking in the opposite direction to Fig. 3. Fig. 5 is a part plan view showing the carrier with the oblique cams mounted therein, in relation to the rotary tappets. Fig. 6 is a similar view, showing the carrier and oblique cam-blocks in section, with their respective operating levers. Fig. 7 is a rear elevation of the automatic timing-mechanism shown in Fig. 3, with the parts in normal position, and Fig. 8 is a front elevation of the same, with one set of duplicate parts in position for effecting a change of gear. Fig. 9 is a face view of the clutch-controlling cam, with the associated parts in normal position, and Fig. 10 is a similar view, with the cam-abutment in position for effecting a change of gear. Fig. 11 is an elementary or diagrammatic plan view illustrating the application of the apparatus of the present invention to the control of a clutch and variable-speed mechanism for transmitting motion from a motor to the driving axle of an automobile.

Referring first to Fig. 11, A represents a portion of the engine. One member B of the main driving-clutch (which is shown as a friction-clutch) is fast on the engine-shaft C and constitutes as usual a flywheel for the engine, the other member D of the clutch being splined upon a shaft E journaled in bearings so as to be permanently in alinement with the engine-shaft C. Integral with the clutch-member D so as to be slidable on the shaft E is a sleeve F about which is coiled a spring G held in permanent compression between a collar *f* on the sleeve and an abutment constituted by the bearing H for the shaft E; the spring G constantly tending to force the clutch-member D into engagement with the clutch-member B, while the position of the clutch-member D is controlled by a lever J fulcrumed at a fixed point *j*.

K is the Cardan shaft, which is coupled at one end by a universal joint $k'$ to the shaft E and at the other end by a similar joint $k^2$ to a shaft L which extends through a bearing *l* into the interior of the casing M which incloses the variable-speed mechanism. The main shaft N of the variable-speed mechanism is journaled at one end in a bearing formed concentrically in the shaft L (which is made hollow for the purpose) and at the opposite end is to be understood as extending into the casing O which incloses the differential gearing through which motion is transmitted to the respective portions O′ and $O^2$ of the driving axle of the vehicle.

The lay-shaft or countershaft P of the variable-speed mechanism is in constant driving connection with the shaft L through a pair of spur-wheels $p^1$, $p^2$, whereof the wheel $p^1$ is fast on the shaft L and the wheel $p^2$ is fast on the shaft P. The wheel $p^1$ carries one member of a dog-clutch Q whereof the other member, which is splined upon the shaft N, has fast with it a spur-pinion *r* adapted to be put into gear with a spur-wheel R fast on the shaft P. The dog-clutch Q and pinion *r*, which are shown as ocupying their neutral or disengaged position, are slidable to and fro on the shaft N under the control of a bell-crank lever S fulcrumed at *s* on the casing M; the shifting of the lever S in the one direction having for effect, by throwing the members of the dog-clutch Q into gear with one another, to cause motion to be transmitted direct from the shaft L to the shaft N in the forward direction, whereas the shifting of the lever S in the opposite direction has for effect, by throwing the pinion *r* into gear with the wheel R, to cause motion to be transmitted from the shaft L to the shaft N through the medium of the wheels $p^1$, $p^2$, R and *r*, also in the forward direction.

Upon the shaft P are splined, so as to slide on the shaft as one, two spur pinions $t^1$ and $t^2$ which are respectively adapted to be put into gear, alternatively, with spur-wheels $T^1$ and $T^2$ both fast on the shaft N. The pinions $t^1$ and $t^2$ are slidable to and fro on the shaft P under the control of a bell-crank lever T fulcrumed at *t* on the casing M; the shifting of the lever T in the one direction having for effect, by throwing the pinion $t^1$ into gear with the wheel $T^1$, to cause motion to be transmitted from the shaft L to the shaft N through the medium of the wheels $p^1$, $p^2$, $t^1$, and $T^1$ in the forward direction, whereas the shifting of the lever T in the opposite direction has for effect to cause motion to be transmitted from the shaft L to the shaft N in the reverse direction, in consequence of the pinion $t^2$ then driving the wheel $T^2$ through the medium of an idle wheel indicated at $t^3$.

It is to be understood that all the parts thus far described constitute usual elements in the driving mechanism of an automobile having three speeds of forward driving and one speed of reverse driving; the parts referred to being shown merely in elementary form and by way of example, as they may be varied within wide limits without in any way affecting the scope of the present invention as defined by the claims appended to this description.

In Fig. 11 the several parts are shown in the position occupied when the lever T has been so shifted from neutral position as to throw the pinion $t^2$ into gear, through the idle wheel $t^3$, with the wheel $T^2$, while at the same time the lever J has been so shifted as to hold the members B, D of the main driving clutch out of engagement with one another during the change of gear; this position corresponding to the position of those parts which are shown as displaced from normal position in Figs. 1, 2, 4, 8 and 10 and hereinafter described with reference to said figures.

The function of the mechanism of the present invention, as applied to automobile driving-gear of substantially the character illustrated in Fig. 11, is to exercise control over the clutch-lever J and change-levers S and T concurrently in such manner that the main shaft N of the variable-speed mechanism will be driven from the shaft L either directly through the dog-clutch Q, or indirectly through the lay-shaft P by means of the wheels R and $r$, or $t^1$ and $T^1$, or $t^2$, $t^3$ and $T^2$ alternatively, and that during an interval slightly longer than that occupied by each change of gear brought about by the shifting of the change-lever S or T, the lever J will be so moved and held as to keep the clutch-member D disengaged from the clutch-member B in opposition to the spring G whereby the main driving-clutch B, D is normally retained in gear.

In the example illustrated, the change-lever S is shown as connected by a link $u^1$ with a bell-crank lever U fulcrumed at $u$ and having pivotally attached to it a rod 28 which, as hereinafter described, is controlled by the improved coördinating mechanism already referred to. Similarly, the change-lever T is shown as connected by a link $v^1$ with a bell-crank lever V fulcrumed at $v$ and having pivotally attached to it a rod 29 which, as hereinafter described, is controlled by the same coördinating mechanism.

The mechanism of the present invention will now be described in detail with reference more particularly to Figs. 1 to 10, only such parts of said mechanism being indicated in Fig. 11 as are necessary for enabling the application of the invention to the automobile driving-gear therein illustrated to be understood.

11 (Figs. 2 and 11) is a rock-shaft through which the clutch-member D is controlled, this shaft having fast on it an arm 12 which is coupled by a link 13 (or pair of links) to the clutch-lever J. Another arm 14, also fast on the rocking-shaft 11 and serving to control this shaft and therefore also the clutch itself, is coupled by means of a pair of links 15, 16 (see Fig. 1) to a pair of diametrically-opposite pins 17 projecting from a ring 18 which embraces a groove formed in the body of the clutch-controlling cam 19; this cam being splined upon a continuously-revolving shaft 20 which extends in the same direction as the links 15, 16 and rotates through one complete revolution for each step performed (as hereinafter explained) by the variable-speed mechanism in the operation of changing gear, whether such step be from an active position to neutral position or vice versa. The face 21 of the clutch-controlling cam 19 is adapted to coact with an abutment constituted by an anti-friction roller 22 carried by a plunger 23 which, at the proper moments, is depressed from and restored to normal position so as to present the roller 22 in and withdraw it from the path of the cam-face 21, thus causing the cam 19 to be displaced lengthwise of the shaft so as to throw the driving-clutch out of and allow it to return into operation just before and just after the step concurrently performed by the variable-speed mechanism.

In Figs. 1 and 10, the abutment-roller 22 is shown as in operative position, while in Figs. 2 and 11 the rocking-shaft 11 is shown as having been (in consequence of such displacement of the cam 19 from normal position) partially rotated so as to throw the driving-clutch out of action. It will be observed that the arm 14 has a pin-and-slot connection at 24 with the links 15, 16, so as to allow for wear in the driving-clutch itself. In the example illustrated the shaft 20 is horizontal, and the links 15, 16 extend horizontally one above and the other beneath the shaft, while the abutment-roller 22 normally (as in Fig. 9) occupies a position in a slot 25 in the upper link 15 (see Figs. 1, 2 and 10), and is depressed through this slot into operative position in opposition to a light spring 26 (inclosed in the guide 27 for the plunger 23) whereby the roller is returned to normal position on the cessation of the pressure whereby it is moved downward as hereinafter explained.

The improved coördinating apparatus already referred to, which is capable of being used in connection with variable-speed mechanism of the ordinary or "clash-in" type no less than with that for which the apparatus (as described in specification No. 1,043,629) was originally and more especially designed, comprises, for each separately-movable gear wheel or equivalent element (or pair of such wheels or elements) constituting a movable member of the variable-speed mechanism, a lever (which may be termed a gear-shifting lever) mounted on a stationary fulcrum and so connected with said movable member as to control its position with reference to the coacting gear-wheel or equivalent element (or pair of such wheels or elements) constituting the corresponding fixed member of the variable-speed mechanism; and, for controlling in common all such gear-shifting levers in predetermined order, a single carrier having a cam-engagement with each lever, this carrier being preferably mounted to slide parallel to the driving-shaft whence the variable-speed mechanism derives its motion; a so-called tappet-shaft extending parallel to the path of the carrier and making one revolution for each change (or each step in a change) of gear, this tappet-shaft being provided with a row of tappets whose number is determined by the number of changes of gear and whose distance apart is determined by the length of the several movements comprised in the travel of the carrier whereby said changes are effected; a pair of oppositely-inclined cams mounted on the carrier and normally retained in inoperative position but respectively adapted to be brought into position to be acted upon by successive tappets in their revolution so as to cause the carrier to be shifted step-by-step through the required distances in one or the other direction, according as the one or the other cam is brought into operative position; and automatic timing-mechanism of the kind described in specification No. 1,043,629, which is controlled by the revolution of the tappet-shaft, and whereby on the one hand the bringing of either of said tappet-actuated cams into operative position by the controlling hand-lever is permitted only when the tappets are in their proper angular relation to the cams and whereby on the other hand a cam, when once brought into operative position, is so held until the resulting movement has been completed.

The improved coördinating mechanism now to be described is designed to provide means for imparting movement to either rod 28 or 29, in either direction, in accordance with the particular change of gear to be effected and in time with the bringing of the clutch-controlling cam 19 into and out of operation.

The slide-rods 28 and 29 extend, one vertically above the other, parallel to the horizontal shaft 20 whereon the cam 19 is splined, and each is actuated by means of one of the gear-shifting levers already referred to; one of said levers being a bell-crank lever 30 whose longer arm engages between a pair of collars 31 on the slide-rod 28, while the other lever 32 is of similar form and engages between a pair of collars 33 on the slide-rod 29. The levers 30, 32, which move in the same horizontal plane, are shown as respectively fulcrumed at 34 and 35 to a fixed horizontal bar 36, their shorter arms carrying respectively anti-friction rollers 37, 38 which both engage in the same cam-groove 39 provided in a slide 40 attached to a carrier 41 which is mounted to travel to and fro in a direction parallel to the rods 28, 29 and shaft 20 and immediately above the latter.

The shaft 20 is journaled in bearings 42, 43 in the lower part of a casing 44 through which the shaft extends; this casing, which is provided with a removable cover 45, serving to support the bar 36 and to house the carrier 41, slide 40, and levers 30, 32. The shaft 20 projects beyond the bearing 43 at one end of the casing 44, so as to carry the cam 19, and also beyond the bearing 42 at the opposite end so as to carry the cams (hereinafter described) for controlling the timing-mechanism; the shaft having fast upon it, beyond these latter cams, a sprocket-wheel 46 through which it receives motion through a chain $46^a$ from another sprocket wheel $46^b$ fast on the engine shaft C (Fig. 11). The guide 27 for the plunger 23 which carries the abutment-roller 22 (for the clutch-controlling cam 19) is shown as supported by a bracket 47 which projects from the casing 44.

The rods 28, 29 traverse the length of the casing 44 and are fitted to slide in bearings at the ends thereof as indicated. The cam-groove 39 which engages the gear-shifting levers 30, 32 is (as shown in Fig. 2) of such form that, when the carrier 41 travels, from the position wherein it is shown in Figs. 1 and 2 at the extreme right-hand end of the casing toward the opposite end, each lever 32 and 30 (and therefore each slide-rod 29 and 28) will in turn receive motion in opposite directions; the four movements thus produced (two for each slide-rod) being of the extent required for bringing about the four changes of gear which the mechanism, as already stated, is designed to effect. The entire traveling movement which the carrier 41 is adapted to perform in either direction is executed in a series of steps, the movement being capable of being reversed on the conclusion of any step. Two distinct steps are required to effect any one complete change of gear, the first step serving to effect the bringing of the variable-speed mechanism to neutral position by the mutual disengagement of the pair of change-wheels or equivalent elements previously in driving connection with one another, and the second step serving to bring either a fresh pair of change-wheels or equivalents into mutual engagement or (if the movement of the carrier 41 be reversed after the first step has been performed) to restore the original pair of wheels or equivalents to mutual engagement as before. A total of six steps in each direction alternatively must therefore (in the example illustrated) be provided for in the travel of the carrier 41, as will be readily understood. For this purpose the continu-

[illegible] 54 in Fig. 1 and [illegible] except the first, counting in either direction, are brought into use successively for [illegible] the carrier through the [illegible] steps [illegible] in its entire travel in either direction. [illegible] tically movable in guides in the [illegible] two blocks 55, 56 which are [illegible] their respective lower faces with [illegible] cams 57, 58 (somewhat similar to portions of internal screw-threads) each of which has an oblique cam-surface 59 or 60 adapted for presentation in the path of one tappet at a time, the respective cam-surfaces 59 and 60 being inclined in opposite directions as shown in Fig. 5. The cam-blocks 55, 56 are mounted directly above the tappet shaft [illegible] and in series with one another in the direction of the travel of the carrier, [illegible] blocks being normally held raised in the inoperative position which is shown in the case of the left-hand block 55 in Fig. [illegible] lengths, inclinations, and distance apart of the respective cam-surfaces 59 and 60 are such that (assuming the carrier to be at an intermediate position in its travel) when either block 55 or 56 is depressed from its normal position to the operative position (shown in the case of the right-hand block 56 in Fig. 1), one of the tappets [illegible] revolution engage the cam-surface [illegible] and will cause the block, and with it the carrier 41, to move in the direction corresponding to the obliquity of the cam-surface of the particular block now brought into play and through a distance equal to the distance apart of two adjacent tappets [illegible] of travel), so that, if the cam-block were thereafter allowed to remain in operative position, its cam-surface would on the next revolution of the shaft 20 be engaged by the next tappet of the series, with the result that the carrier would be moved through another step of travel in the same direction. In Fig. 1 the block 56 is shown in operative position, the extreme right-hand tappet 54 being understood to have just caused the movement of the carrier through the last [illegible] of its total travel toward the right [illegible] indicated [illegible] in Fig. 5.

[illegible] pressed into operative position [illegible] such block, when once brought into such position, is so held until the [illegible] with its cam-surface [illegible] and in so doing has effected the operation of shifting the carrier and bringing about the [illegible]

[illegible] as the longi- [illegible] the [illegible] of [illegible] of op- [illegible] blocks 55 and [illegible] 63 and [illegible] to the shaft 20, [illegible] at opposite sides [illegible] rocking-shafts form- [illegible] supports and [illegible] Each lever-arm [illegible] at a point [illegible] recess 65 or 66 [illegible] side of the [illegible] the corre- [illegible] laterally, so that both [illegible] to travel with the [illegible] rocking-shafts; while the [illegible] in cross-pas- [illegible] cam-blocks so as to [illegible] the blocks relatively to [illegible]

[illegible] oscillation of either [illegible] required for bringing [illegible] cam-block 55 or 56 into or [illegible] operative position is [illegible] simultaneously [illegible] into or [illegible] of the [illegible] controlling cam 15. For [illegible] rocking-shafts 63 and 64 [illegible] respectively [illegible] which [illegible] through the [illegible] operative posi- [illegible] the return [illegible] position [illegible] of the shafts 63 [illegible] through [illegible] on the re- [illegible] opposite [illegible] For ex- [illegible] Figs. 2, [illegible] these motion is [illegible] angular movement of the arms 69, 70 (and therefore of the shafts 63, 64) and on the other hand to return to normal position whichever arm has been depressed, and thus to rock back to normal position the corresponding shaft 63 or 64.

It will readily be understood that in place of the single spring 74, serving for both shafts 63 and 64 in common, any other form of spring or springs suitably adapted for the purpose may be used.

The arms 69, 70 are normally both held locked in the raised position, shown in Figs. 3 and 7, by means of levers 75, 76 fulcrumed at 77, 78 and provided with detents 79, 80 which normally engage nibs 81, 82 on the respective arms, the mutual engagement thus normally maintained between the arms 69, 70 and levers 75, 76 serving to retain not only the arms but also the levers themselves in normal position.

The levers 75, 76 have projections 83, 84 which are normally both engaged, from opposite directions respectively, by pins 85, 86 carried by the lateral arms 87, 88 of a three-armed lever fulcrumed at 89 beneath the shaft 20, the central third arm 90 of this lever being connected by a rod 91 to a controlling hand-lever W (Fig. 11) mounted at some convenient point and adapted to be angularly displaced from a mid or normal position toward one side or the other at will according as it is desired to effect an upward or a downward change of gear in the variable-speed mechanism. On this controlling hand-lever W being so displaced from normal position as to move the arm 90 toward, say, the right in Fig. 3, or the left in Fig. 7, the pin 85 will press upon the projection 83 and move the lever 75 so as to withdraw the detent 79 from engagement with the nib 81, the pin 86 meanwhile rising out of contact with the projection 84 on the lever 76 and therefore leaving the engagement between the detent 80 and nib 82 undisturbed. The immediate result of the movement described is exhibited in Fig. 8, a corresponding result being produced, but in the converse sense, if the controlling hand-lever W be so displaced as to move the arm 90 in the opposite direction to that just mentioned.

For the purpose of returning to normal position whichever of the levers 75, 76 has been displaced therefrom (such return occurring in time with the return to normal position of whichever of the arms 69, 70 and shafts 63, 64 has been displaced) the levers 75 and 76 extend toward one another alongside of the respective arms 69 and 70 and carry at their extremities anti-friction rollers 93, 94 both of which are adapted to contact with the same cam 92 fast on the tappet-shaft 20 alongside of the cam 73. As will be seen on reference to Fig. 8, which illustrates the action in respect of the lever 75, the displacement of this lever from normal position is limited by its roller 93 contacting with the cam 92 which, in the course of its revolution (during which the tappets on the shaft 20 will have done their work), restores the lever to normal position in time to lock the corresponding arm 69 immediately after the latter has been restored to normal position by the concurrent revolution of the cam 73; the return movement of the lever 75 bringing about the restoration of the controlling hand-lever W to normal position as the result of the forcible engagement of the projection 83 with the pin 85.

95 is a separately-movable cover (shown in Fig. 1 alone) for protecting the timing-mechanism which is placed externally of the main casing 44; the timing-mechanism as a whole, except the cams 73 and 92, being mounted for convenience on a detachable plate 96.

It will now be understood that (taking a complete cycle of action of the apparatus as a whole) on the controlling hand-lever W being displaced in either direction from normal position (which can occur only when the cam 92, in its rotation, permits displacement of the lever 75 or 76), the resulting movement of the three-armed lever 87, 88, 90 will unlock the arm 69 or 70 and thus allow the rocking-shaft 63 or 64 to turn and the abutment roller 22 to descend into the path of the cam 19, with the result that the driving-clutch B, D will be thrown out of gear, while at the same time the cam-block 65 or 66 will be depressed into operative position. As soon as the particular tappet in whose path the cam-surface 59 or 60 of the depressed cam-block has been interposed has done its work (thus bringing about a movement of the slide-rod 28 or 29 and effecting the required step in the operation of changing gear), the continued rotation of the cam 73 will restore the arm 69 or 70 to normal position, thus withdrawing the cam-block 65 or 66 from operative position; whereupon the cam 92 will restore the lever 75 or 76 to normal position so as to lock the arm 69 and 70, while at the same time the abutment-roller 22 will be allowed to rise out of the path of the cam 19 so that the driving-clutch B, D will be returned into gear by its spring.

From the above description it will be seen that the entire apparatus herein described for controlling both the driving-clutch and the variable-speed mechanism is in effect self-contained and wholly independent of the gear-box M which contains the change-wheels. The apparatus may therefore be very readily fitted or adapted to any existing automobile or similar driving-gear, the movable members of the variable-speed mechanism in the gear-box being coupled to the slide-rods 28, 29 as shown or to additional and similar slide-rods if such be required.

Obviously, various modifications in the mechanical details of construction may be required in adapting the operative principles of my device to various types of machines. Such modifications as may be required in the mechanical construction of the operative mechanism of the gears, clutches or coördinating elements to thus adapt my invention can readily be understood and carried out by those skilled in the art without departing from the spirit and scope of the invention as described.

What I claim is:—

1. The combination with a prime mover, of variable speed mechanism, a clutch and means operated by said prime mover for operating the clutch and concurrently effecting a change in the variable speed mechanism, substantially as set forth.

2. The combination with a prime mover, of variable speed mechanism, a clutch adapted to connect the prime mover with the variable speed mechanism and means operable from the prime mover for operating the clutch and concurrently effecting a change in the variable speed mechanism, substantially as set forth.

3. The combination with a prime mover, of variable speed mechanism, a clutch, means operated by said prime mover for automatically operating said clutch and concurrently effecting a change in said variable speed mechanism and manually operable means for bringing said automatic means into action at will, substantially as set forth.

4. The combination with a prime mover and an element to be driven thereby, of interposed variable speed mechanism and a clutch, and means operated by said prime mover for automatically operating the clutch and effecting a change in the variable speed mechanism, substantially as set forth.

5. The combination with a prime mover and an element to be driven thereby, of interposed variable speed mechanism and a clutch, means, independently driven from said prime mover for automatically operating said clutch and concurrently effecting a change in the variable speed mechanism and means, operable at will, for bringing said automatic means into operation, said automatic means being adapted to complete an operation once initiated, substantially as set forth.

6. The combination with a prime mover and an element to be driven thereby, of interposed variable speed mechanism and a clutch, levers for operating the variable speed mechanism and clutch respectively and cams adapted to be driven by said prime mover, independently of said driven element, for automatically operating said levers and thereby opening and closing said clutch and concurrently effecting a change in said variable speed mechanism, substantially as set forth.

7. The combination with a prime mover and an element to be driven thereby, of interposed variable speed mechanism and a clutch, levers for operating the variable speed mechanism and clutch respectively, cams adapted to be driven by said prime mover, independently of said driven element, for automatically operating said levers and thereby opening and closing said clutch and concurrently effecting a change in said variable speed mechanism and means, operable at will for bringing said cams into operation and keeping them in operation until the automatic cycle is completed the cams being so coördinated as to open the clutch before and close it after any change in said variable speed mechanism.

8. The combination with a prime mover and an element to be driven thereby, of interposed variable speed mechanism and a clutch, mechanism for automatically operating the clutch concurrently with a change in the variable speed mechanism said clutch being adapted to open before and close after a change in the variable speed mechanism, a shaft driven from the prime mover independently of said driven element for operating said mechanism, manual means for bringing said automatic mechanism into operation and means for timing and controlling the automatic mechanism and said manual means, substantially as set forth.

9. The combination with a prime mover and an element to be driven thereby, of an interposed clutch, and means driven by said prime mover for automatically operating said clutch, said automatic means being manually controlled, substantially as set forth.

10. The combination with a prime mover and an element to be driven thereby, of an interposed clutch, shaft and cam driven by said prime mover, a plunger adapted to coöperate with said cam, timing means for controlling said plunger and manual means coöperating with said timing means to initiate a movement of said plunger at will whereby said clutch may be automatically opened and closed.

11. The combination with a prime mover and an element to be driven thereby, of an interposed variable speed mechanism and a clutch, a shaft driven by said prime mover, a cam revoluble with said shaft, a plunger member coöperating with said cam for controlling said clutch, cams on said shaft for controlling the variable speed mechanism, a carrier mounted to slide parallel to said shaft carrying a pair of oppositely inclined plunger cams adapted to coöperate with said last mentioned cams for reciprocating said carrier, a pair of rock shafts carrying arms for operating the clutch plunger member and said plunger cams, timing means connected with said shaft for controlling the operation of said rock shafts and manually operable means for permitting said rock shaft to be rocked at will thereby initiating the movement of said plunger and the operation of said clutch, substantially as set forth.

RICHARD MATTHEWS RUCK.

Witnesses:
JAMES HENRY BOYD,
BERTRAM R. J. BEW.